United States Patent [19]
Aldhart et al.

[11] Patent Number: 4,826,741
[45] Date of Patent: May 2, 1989

[54] ION EXCHANGE FUEL CELL ASSEMBLY WITH IMPROVED WATER AND THERMAL MANAGEMENT

[75] Inventors: Otto J. Aldhart, Fair Lawn; Matthew J. Rosso, Jr, Ringwood, both of N.J.

[73] Assignee: Ergenics Power Systems, Inc., Wyckoff, N.J.

[21] Appl. No.: 57,377

[22] Filed: Jun. 2, 1987

[51] Int. Cl.$^4$ .............. H01M 8/18; H01M 8/04; H01M 8/10; H01M 2/00

[52] U.S. Cl. .............................. 429/19; 429/26; 429/30; 429/32; 429/34

[58] Field of Search ..................... 429/17, 30-34, 429/26, 19

[56] References Cited

U.S. PATENT DOCUMENTS

| | | | |
|---|---|---|---|
| 4,037,024 | 7/1977 | Landau | 429/17 |
| 4,155,712 | 5/1979 | Taschek | 429/19 X |
| 4,175,165 | 11/1979 | Adlhart | 429/30 |
| 4,345,008 | 8/1982 | Breault | 429/26 |
| 4,463,068 | 7/1984 | Cohn et al. | 429/34 |
| 4,489,779 | 12/1984 | Dickinson et al. | 73/302 X |
| 4,515,871 | 5/1985 | Shirogami et al. | 429/34 |
| 4,519,043 | 5/1985 | LaForge et al. | 324/207 X |
| 4,529,670 | 7/1985 | Findl | 429/34 X |

Primary Examiner—Stephen J. Kalafut
Attorney, Agent, or Firm—Charles E. Baxley

[57] ABSTRACT

A fuel cell for generating electricity by using an ion exchange membrane as electrolyte. Such fuel cells are generally arranged as a stack. Each fuel cell has a fuel electrode to which gaseous hydrogen is fed, an oxygen electrode to which oxygen is fed, an ion exchange membrane sandwiched therebetween, a fuel distribution member for supplying fuel to the fuel electrode, and an oxygen distribution member for supplying oxygen to the oxygen electrode. These fuel cells are characterized by a liquid-permeable electricity-conductive member in the form of a layer for storage and transport of water produced in the fuel cell. The fluid-permeable member is separated from the electrodes and the fuel cell is contained between outer impermeable sheets.

The fuel cell assembly is part of a system that also removes heat from the assembly during its operation. The heat removal is accomplished alternately by evaporative cooling, direct air cooling, cooling with recirculating liquid or cooling by direct heat conduction to a heat sink.

The system further is provided with a hydride container and a hydride bed in which gaseous hydrogen is generated. The gaseous hydrogen is used as fuel in the fuel cells. The hydrogen is liberated from the hydride bed predominantly by the heat generated in the fuel cell.

37 Claims, 3 Drawing Sheets

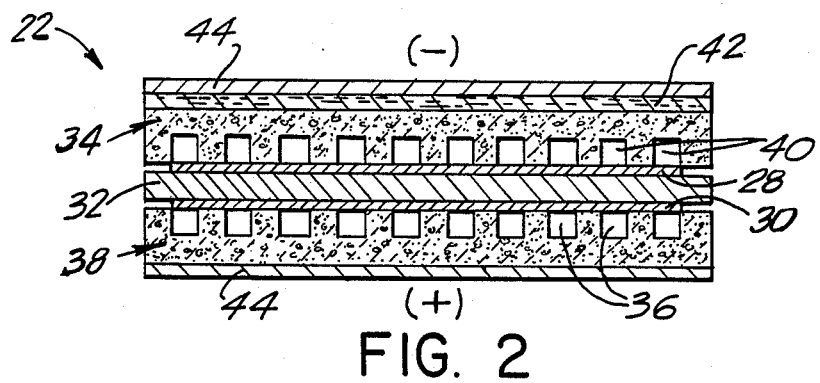
FIG. 2
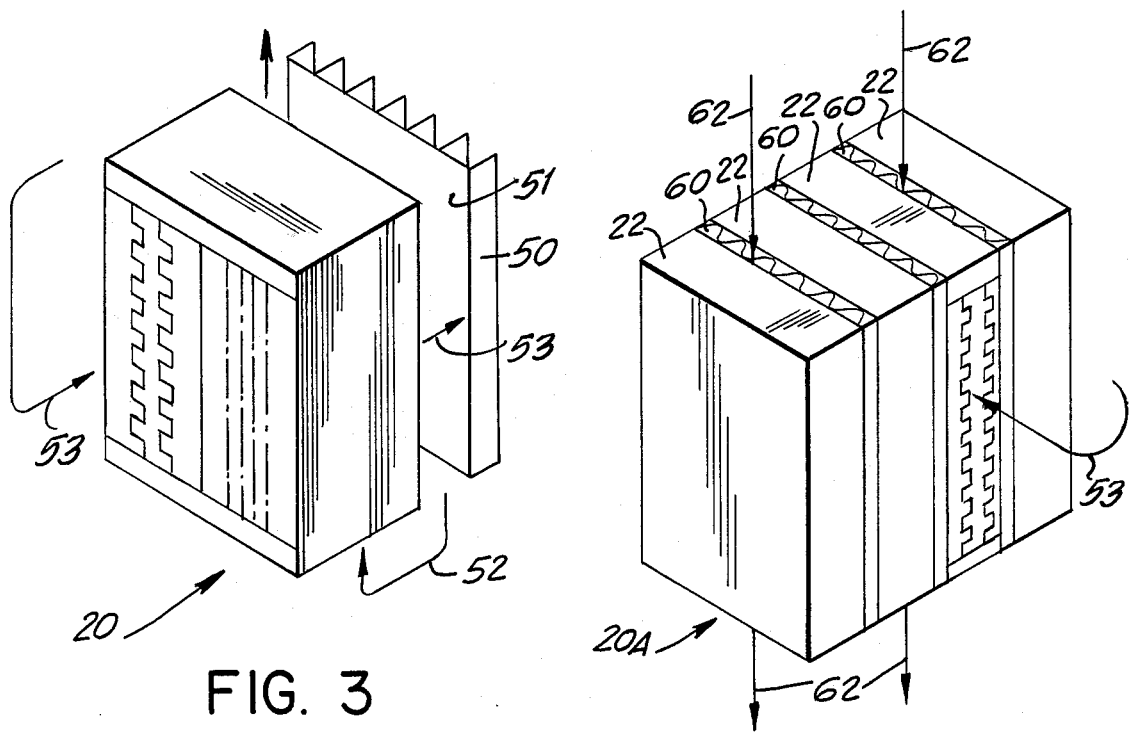
FIG. 3
FIG. 4
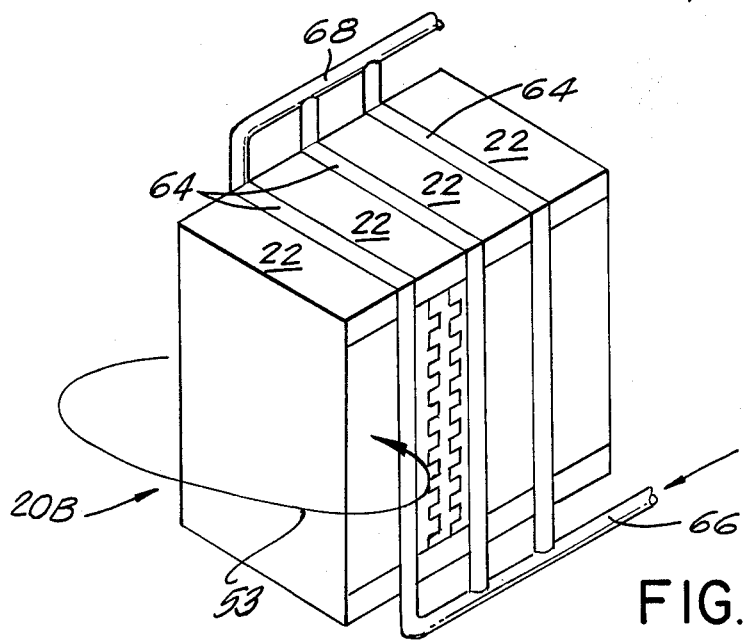
FIG. 5

ION EXCHANGE FUEL CELL ASSEMBLY WITH IMPROVED WATER AND THERMAL MANAGEMENT

BACKGROUND OF THE INVENTION

This invention relates to fuel cell assemblies with ion exchange membrane cells such as taught in U.S. Pat. No. 4,175,165 by the first-named inventor herein. More particularly, this invention provides cell assemblies with improved water and thermal management.

It has been known for some time that fuel cell assemblies with ion exchange membrane cells can be suitable sources of electric power. They may be started up at or below room temperature and require no corrosive electrolytes for operation. A hydrogen-oxygen reaction is employed for power generation, so water is the reaction product and thus the only liquid to be dealt with.

Hydrogen is a viable fuel choice for cells with ion exchange membrane electrolytes. Hydrogen can be obtained from known sources such as methanol. However, hydrogen stored as a reversible metal hydride is especially attractive. Typical reversible metal hydride formers include $LaNi_5$, $FeTi$ and $MmNi_{4.15}Fe_{0.85}$ among others. Storage density of hydrogen in hydrides is abundant and provides an attractive alternative to other modes of hydrogen supply, from the standpoint of safety. Hydrogen release from hydride storage vessels is limited by available heat supply, because of the endothermal nature of the hydrogen release reaction (typically in the order of 7.5 K cal/mol $H_2$).

The development of suitable stacked assemblies using the ion exchange membrane fuel cell has been subject to various problems, mainly related to water and thermal management requirements.

Highly conductive ion exchange membranes have been available from E. I. DuPont Nemours and Company as perfluorosulfonic acid membranes known under the trademark NAFION. Dow Chemicals Co. has also developed high performance ion exchange membranes. Dow's U.S. Pat. No. 4,417,969 discloses membranes comprising a substantially fluorinated polymer with pendant chains containing sulfonic acid ion exchange groups. Excellent performances are obtained using these membranes if the fuel cells are operated under fully hydrated, essentially water saturated conditions. Such a saturated condition, however, is difficult to maintain in stacked assemblies. Cell flooding, caused by buildup of product water in the stack, or membrane dehydration brought about by thermal gradients, or excessive water evaporation due to reactant gas flow, can each or all result in performance loss as well as membrane degradation.

Reactant gases have to be distributed over large electrode surfaces without resulting in local drying of the ion exchange membrane. Neither may the accumulation of product water interfere with the distribution of reactants.

Cell temperature is highly significant in this context. If cooling is not accomplished with a minimum temperature gradient across the electrodes, uniform current density will not be maintainable.

Suitable cell and system designs which address these problems are a prerequisite for the development of fuel cell power plants using the ion exchange membrane cell.

The problems of water management have been addressed by the first-named inventor herein in U.S. Pat. No. 4,175,165 in which hydrophylic coatings are applied to relevant structures in fuel cell assemblies to facilitate runoff of product water. The hydrophylic coating approach, however, is effective only in small cell configurations, and even there protection against cell drying is not adequate.

U.S. Pat. No. 4,215,183, assigned to General Electric Company, teaches use of a wet proofed carbon paper placed upon the catalytic electrode bonded to the membrane to prevent electrode flooding. Yet the approach of U.S. Pat. No. 4,215,183 did not resolve the problem of water removal from a cell assembly or membrane dehydration.

Accordingly, a need existed for an ion exchange membrane fuel cell and related stack thereof with an improved arrangement for heat and water management. It was also desired to present such a fuel cell stack which effectively makes use of hydride stored hydrogen for cell operation drawing on heat generated in cell operation for the liberation of hydrogen.

BRIEF STATEMENT OF INVENTION

The foregoing and other deficiencies of the prior art are here overcome in a particularly useful, novel and unobvious way. Each fuel cell of a stack is provided with a water transport layer that presents flexible design options in water management and enables optimization of individual fuel cell and stack design.

Thus it is an important objective of the present invention to provide an ion exchange membrane cell enabling achievement of improved water and thermal management. Stated differently, it is an object of this invention to provide such a fuel cell which overcomes membrane flooding and dehydration, and which further provides effective means for heat dissipation.

It is another object of this invention to provide such a fuel cell in which evaporation of water stored in, or supplied to, the cell may be used to remove heat from a stacked cell configuration.

It is yet another object of this invention to provide such a fuel cell which accommodates liquid cooling or air cooling.

It is yet another object of this invention to provide such a fuel cell which enables enlargement of stack configurations.

It is yet a further object of this invention to provide such a stacked fuel cell system which uses heat produced in the fuel cell to liberate hydrogen from a hydride bed so as to provide required hydrogen fuel.

SUMMARY OF THE INVENTION

A fuel cell assembly according to the invention includes a plurality of stacked fuel cells, each having a fuel electrode and an oxygen electrode, an ion exchange membrane between and engaging both of said electrode, a fuel distribution plate for supplying fuel to the fuel electrodes, an oxygen distribution plate for supplying oxygen to the oxygen electrode, a fluid-permeable electrically-conductive member isolated from the electrodes, and impermeable conductive outer members. Positioning of the fluid-permeable electrically-conductive member (the product water storage and transport member) is a matter of design choice, but it must be between the outer members and spaced outward from the electrodes.

The assembly is usually part of an integrated system that also provides for removal of heat from the fuel cell assembly during its operation. Heat removal may be accomplished alternatively by evaporative cooling, direct air cooling or liquid cooling.

The integrated system preferably also comprises a hydride bed from which gaseous hydrogen fuel is generated for the fuel cell. The gaseous hydrogen is the fuel consumed in the fuel cells. The integrated system also passes waste heat from the fuel cells to the hydride bed where the waste heat is used to liberate hydrogen from the hydride bed for fuel. The mode of heat transfer depends on the type of cell cooling. Said mode of heat transfer may rely on water condensation from the hot reactant air which leaves the stack. Equally, heat transfer by direct contact between cell stack and hydride vessel may be relied upon. Or the liquid coolant used to remove heat from the cell may provide the heat required for hydrogen release.

DESCRIPTION OF THE DRAWINGS

The foregoing and other features and advantages will appear more fully from drawings which accompany this writing and wherein:

FIG. 2 is an end view of a single fuel cell of the assembly of FIG. 1;

FIG. 3 is a perspective schematic view of a vertically organized assembly, illustrating removal of heat from the assembly by means of evaporative cooling;

FIG. 4 is a perspective schematic view of a vertically organized fuel cell assembly, illustrating removal of heat from the assembly by means of direct air cooling;

FIG. 5 is a perspective schematic view of a vertically organized fuel cell assembly, illustrating removal of heat from the assembly by means of liquid cooling;

DESCRIPTION OF PREFERRED EMBODIMENT

Figure 1:
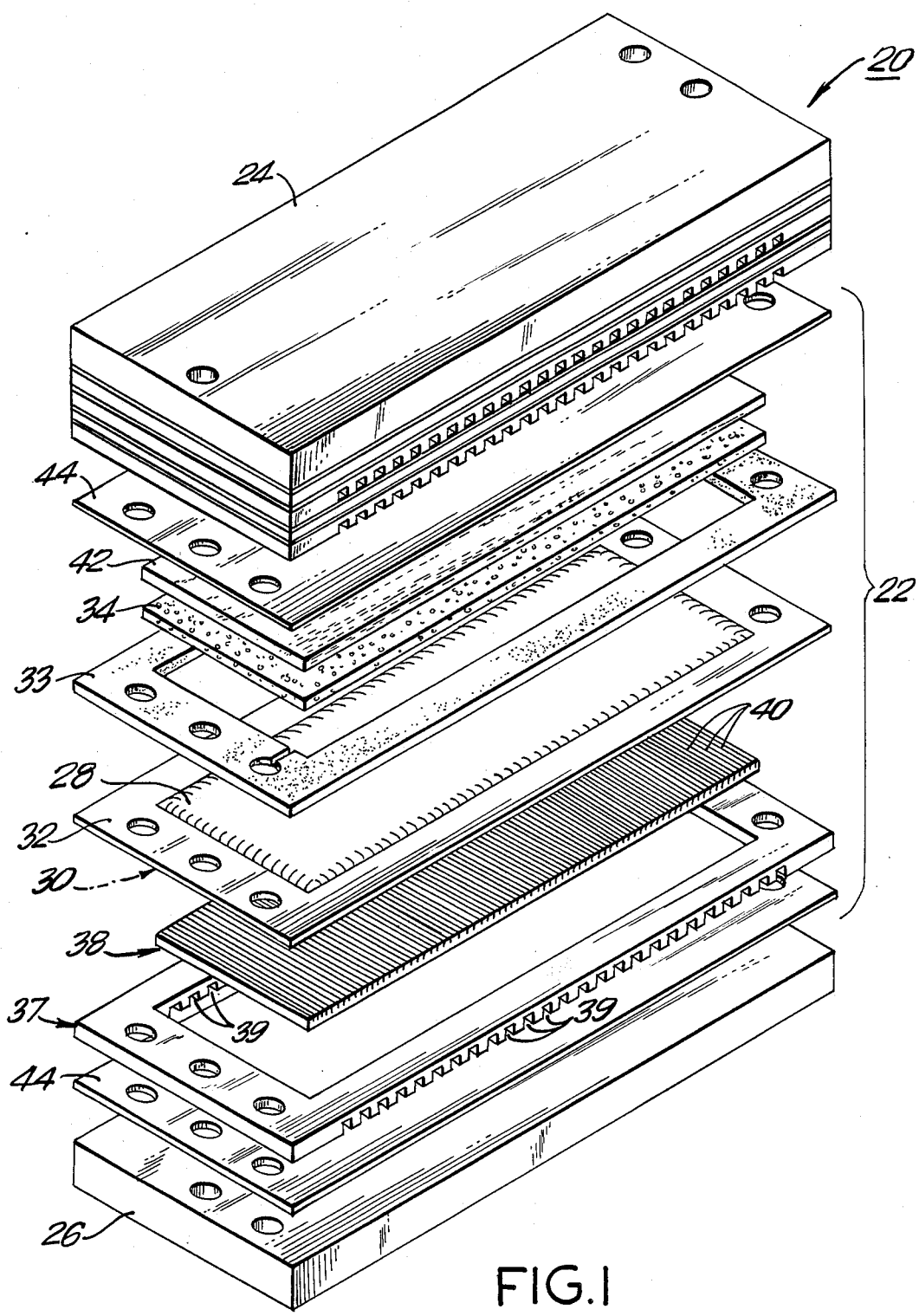
FIG. 1 is an exploded, somewhat schematic perspective view of a preferred stacked assembly of fuel cells according to the present invention.

FIG. 1 shows a preferred fuel cell assembly, indicated generally as 20, including a plurality of stacked fuel cells 22. Cells 22 are stacked in a bipolar mode and held together by end plates 24 and 26 in a known fashion as disclosed in U.S. Pat. No. 4,175,165.

Each fuel cell 22 is comprised of the following components. A gas impermeable electrically conductive sheet 44 is in electrical and mechanical contact with a hydrophylic fluid-permeable member 42 and a porous hydrophobic distribution plate 34 is in mechanical contact with opposite face of member 42. Hydrophylic fluid-permeable member 42 and hydrophobic distribution plate 34 are enclosed within a gasket 33, e.g. silicone rubber or Vitron, which forms a gas-tight seal for the fuel electrode side. Distribution plate 34 is also in electrical and mechanical contact with the catalytic fuel electrode 28 over its entire surface and has grooves 40 confronting fuel electrode 28. The fuel electrode 28 is bonded to an ion-exchange membrane 32 which has the catalytic oxygen electrode 30 bonded to the opposite face. A second hydrophobic porous distribution plate 38 is in electrical and mechanical contact with the oxygen electrode 30. Porous distribution plate 38 has grooves 36 confronting oxygen electrode 30 and is enclosed within an insulated cathode frame 37, e.g. plastic or hard rubber, which has reactant air slots 39. The cathode frame 37 and the distribution plate 38 are both in electrical and mechanical contact with a gas-impermeable electrically conductive separator sheet 44 which completes one fuel cell 22. A plurality of fuel cells are so stacked and compressed between end plates 24 and 26 to complete the fuel cell assembly 20.

Additional construction details of each fuel cell 22 are shown in FIG. 2 which depicts cell 22 as comprising a pluraltiy of layers, including a catalytic fuel electrode 28 to which fuel is fed, a catalytic oxygen electrode 30 to which an oxygen containing gas is fed, and an ion exchange membrane 32 between and in contact with electrodes 28 and 30. Ion exchange membrane 32 functions as an electrolyte member. The layers of fuel cell 22 further include an electrically-conductive reactant distribution plate 34 contacting fuel electrode 28 over substantially its entire area. Distribution plate 34 is of porous material which may have grooves 40 confronting its adjacent fuel electrode 28. However, as shown in FIG. 1, the grooves 40 of the material may be omitted. Fuel cell 22 further comprises an electrically-conductive reactant distribution plate 38 contacting the oxygen electrode 30 over substantially its entire area. Distribution Plate 38 is of porous material and as shown has grooves 36 confronting its adjacent oxygen electrode 30. However, the grooves 36 of the material may be omitted.

Fuel cell 22 further has a fluid-permeable electrically-conductive member 42 here shown outward of and in contact with reactant distribution plate 34 on a face thereof remote from electrode 28. Alternative constructions place member 42 outward of reactant distribution plate 38 or both plates 34 and 38. Fuel cell 22 has outer faces in the form of gas-impermeable conductive sheets 44 providing means for separating reactant gases from adjacent stacked fuel cells.

Reactant distribution plates 34 and 38 may advantageously be metal screens or metallized plastic screens, or porous plastics or ceramics or may be perforated and corrugated metal sheets. Alternatively, the distribution plates 34 and 38 may be fabricated of carbon foam, such as reticulated vitreous carbon. Another suitable material for the plates 34 and 38 is porous graphite, with or without the grooved pattern seen in FIG. 2. The thickness of the distribution plates 34 and 38 typically is in a range of from 0.2 mm to 5 mm. The distribution plates 34 and 38 may be fabricated with gold flash or nickel flash to reduce contact resistance. Further, the distribution plates 34 and 38 are hydrophobic, and may be so rendered by impregnation with tetrafluorethylene (Teflon).

The fluid-permeable electrically conductive member 42 provides means for storing and transporting water to and from the fuel cell 22 and may be a mineral or organic fiber pad embedded in a metal screen, so that electric current can be conducted through fluid-permeable member 42. For example, member 42 is a reticulated graphite foam. Alternatively, the fluid permeable member 42 may be of porous graphite or carbon, rendered hydrophylic by impregnation with colloidal silica, or consist of metallized ceramics.

Electric power generation occurs essentially in the catalytically activated membrane 32. Ionic conductivity results from migration of hydrogen ions through polymer chains in the membrane 32. Power is generated by the reaction of the hydrogen fuel at the catalytic electrode 28 releasing electrons and entering the polymer as protons. At the oxygen electrode 30 protons from the catalytically activated membrane 32 react with oxygen and the electrons returning from the electrical load to produce water which must be removed from the fuel cell 22.

In operation of a fuel assembly 20, a reactant stream of oxygen containing gas and a reactant stream of gaseous hydrogen fuel enter assembly 20 and the fuel is consumed therein, generating heat that must be removed. FIGS. 3, 4 and 5 schematically illustrate how this heat removal can be achieved, alternatively by evaporative cooling, direct air cooling and liquid cooling, respectively.

In FIG. 3 there is shown the fuel cell assembly 20 and a finned plate 50 spaced therefrom and providing a condensing surface 51. A reactant stream 53, upon exiting assembly 20 is water saturated. The stream impinges upon plate 50, giving up heat and becoming a condensate of liquid water that may be recirculated back to the fuel cell assembly 20, as schematically indicated at 52. The evaporative cooling heat removal arrangement of FIG. 3 may be likened to an open heat pipe. One of the advantages of this arrangement over alternate modes of cell cooling is that the reactant air flow may be many times the stoichiometric required value without the need for prehumidification to prevent cell drying.

The arrangements of FIGS. 4 and 5 involve modifications of fuel cell assembly 20. In an air-breathing system, air is supplied by diffusion or forced flow and enters the cell assembly 20 directly through openings (not shown) along the side of the stack of fuel cells 22. Hydrogen is admitted through a common manifold (not shown).

In FIG. 4 there is shown a fuel cell assembly 20A, in which cooling elements 60 are placed between fuel cells 22 or groups of fuel cells 22, to permit cooling air to pass through assembly 20A, as illustrated schematically at 62. In FIG. 5 there is shown a fuel cell assembly 20B, in which cooling elements 64 are placed between fuel cells 22 or groups of fuel cells 22. Liquid coolant enters fuel cell assembly 20B as illustrated schematically at 66, traverses assembly 20B through elements 64 and, now hot, exits cooling element 64 as illustrated schematically at 68, whence it may be directed to a heat exchanger. Elements 60 and 64 must be electric conductors. Tubes 66 and 68 must be electrically insulated from the fuel cell stack.

Figure 6:
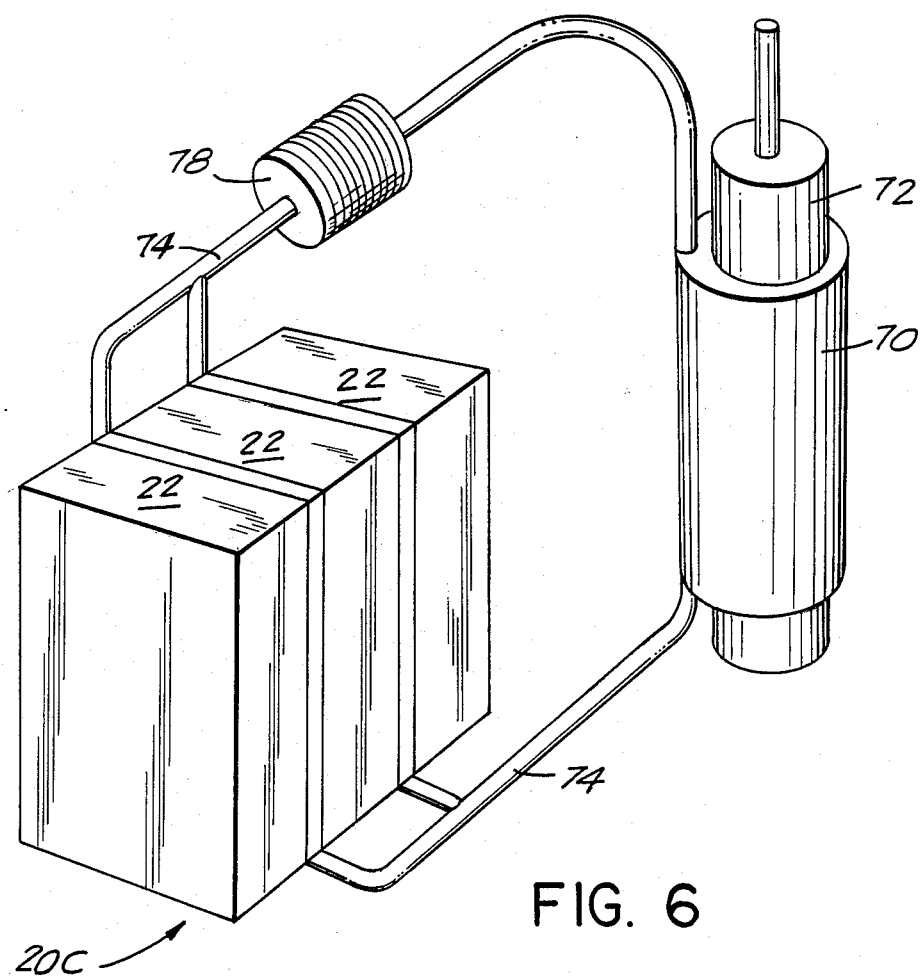
FIG. 6 is a perspective schematic view of a vertically organized fuel cell assembly, illustrating use of hydrogen gas from a hydride bed in a hydride container as fuel for running the fuel cells.

The inventive fuel cell assembly can advantageously be run with hydrogen gas as its fuel. FIG. 6 illustrates schematically such an arrangement, comprising a modified fuel cell assembly 20C cooled by recirculating coolant as described in the text above, and a hydride container 70 containing a hydride bed 72. Hydrogen fuel is generated in the hydride bed 72 by heat derived from the fuel cell coolant stream 74. Excess heat, generated in the fuel cell operation which is not needed for hydrogen liberation is dissipated in an air cooled heat exchanger 78.

Figure 7:
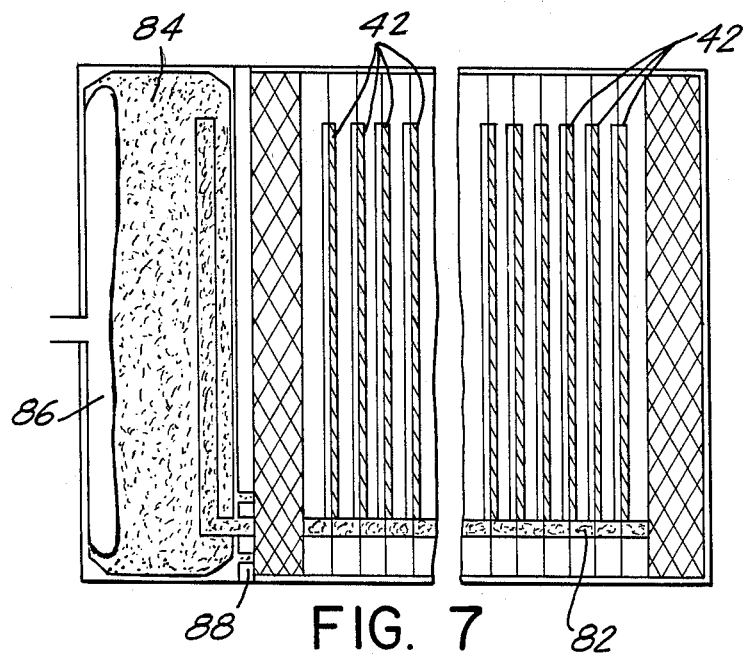
FIG. 7 is a side elevational view in section showing an arrangement for water removal from a fuel cell assembly under zero gravity conditions.

FIG. 7 shows a water recovery system for use at zero gravity wherein water is transported from a plurality of fluid permeable members 42. The fluid permeable member 42 serves for water transport and storage. Its function is to distribute extrinsically introduced water which enters a fuel cell 22 and to draw product water therefrom. A wicking pad 82 is connected to a water absorbent blotter 84 whence the water is expelled by means of an inflatable bladder 86 via a recovery port 88.

An alternative arrangement to FIG. 7 is suitable for short missions in terrestrial or zero gravity eliminates the need for the storage reservoir 84, the wicking structure 82 and the bladder 86. In this case, the product water is stored in the fluid permeable member 42 within each cell and removed at the end of each mission by applying a vacuum through the same passages provided for the wicking structure 82. This may be conveniently done with a suction pump to recover a large portion of the water present within member 42 as liquid water. Member 42 may be enlarged for this purpose depending on the duration of the mission.

EXAMPLE 1

A five cell assembly is operated with hydrogen and air. The cell stack is cooled by water evaporation to the reactant air stream. The cells each have an active area of 100 $cm^2$ (5 cm×20 cm) and use Nafion 117 ion exchange membranes. Both sides of the membrane are activated with a layer of platinum catalyst laminated onto the membrane. Contacting the catalyzed surface on the anode is a 0.2 cm thick reactant distribution structure. A 0.1 cm thick sheet is used for this purpose on the cathode. Both bodies are fabricated from porous graphite (0.36 $g/cm^3$) which is impregnated with Teflon emulsion to render it hydrophobic. In the cathode compartment—in addition to the water repellent structure—a hydrophylic water transport component is placed. Located between the reactant distribution plate and a 0.06 cm thick Grafoil sheet which serves as the gas impermeable separator—the hydrophylic elements permit water wicking into the cells. They are 0.18 cm thick porous graphite plates (0.36 $g/cm^3$), grooved to also provide gas access to the cells. The porous graphite is coated with colloidal silica to render it hydrophylic.

The cell is operated at a hydrogen pressure of 1.5 PSIG in a "dead end" mode. Ambient air is supplied at essentially atmospheric pressure. The air flow rate is 4-6 L/min (about 5 times stoichiometric). Electrical measurements on the operating five cell stack indicate the stack voltage is 3.5 V at 12 A output current. At this voltage 28.2 Kcal/hr of heat are generated based on the lower heating value of hydrogen. Part of this heat is dissipated by natural convention from the stack surface and the sensible heat of the reactant gases. However, depending on conditions, a significant fraction of the heat relies on water evaporation for its removal from the cell stack. For instance, at a stack temperature of 55° C. and an ambient temperature of 22° C., 26 g of water are vaporized per hour from the stack in addition to the water formed in the electrochemical reaction (20 g/hr). This corresponds to 13.7 Kcal/hr or 48.6% of the heat generated. The energy required for water evaporation stabilizes the stack temperature at 55° C. for this operating condition. The water is supplied from an external source and wicked into the stack from the bottom and distributed to each cell via the hydrophylic plates.

EXAMPLE 2

An air breathing stack with 17 cells is operated with hydrogen derived from a hydride storage vessel. The heat available from the fuel cell is utilized in this test to liberate hydrogen from the hydride storage vessel. The mode of heat transfer involves water evaporation from the fuel cell to the reactant air stream and its subsequent condensation on the surface of the hydride storage vessel.

EXAMPLE 3

The five cell assembly of Example 1 is operated with hydrogen—oxygen. In this test, the product water is stored within the cell in member 42 and removed after cell operation by applying a vacuum to manifold 82. The thickness of member 42 is increased from 0.18 cm to 0.5 cm to accommodate additional water. The cell stack is operated at 10 A in a "dead end" mode. Hydrogen and oxygen are supplied at 1.5 psig. The stack voltage is 4.0 volts. After 5½ hours, cell operation is interrupted to remove product water. A vacuum is applied to manifold 82 and 93 g of water are collected subsequently, cell operation is resumed. Stack cooling is accomplished by heat dissipated through the end plates.

The construction of the stack is identical to that described in Example 1. The hydride storage vessel consists of two cylindrical stainless steel containers. They have a diameter of 3.2 cm, are 17.5 cm long and are filled with a total of 950 g of HY-STOR 209, a mischmetal-nickel-iron alloy manufactured by Ergenics, Inc. The combined hydrogen storage capacity is 100 liters (STP). At room temperature, the hydrogen pressure ranges between 150-200 PSIG. It is reduced for cell operation in a regulator to 1.5 PSIG. Air is supplied to the fuel cell from ambient air by a miniature DC blower. The flow is restricted by an orifice at the suction side of the blower. The air passes through the stack providing oxygen for the electrochemical reaction and evaporating water to affect cell cooling.

The stack temperature—for a given load—varies with the air flow. For instance, with a 7 ampere load, (12.4 volts and 87 watts), the effluent air equilibrates at a temperature of 55°-57° C. at a flow rate of 12 liters/min (5.5×stoichiometric). The exiting effluent air is directed to the hydride storage vessels. As the air contacts the hydride storage vessels, air temperature declines to 50°-53° C. and moisture is condensed on the stainless steel cylinders to liberate the hydrogen consumed in supplying the load. At this load, the fuel cell operates continuously for 110 minutes at which time the hydrogen content of the hydride storage vessel has been consumed. Continous operation has been achieved with loads as high as 140 watts at 12 A.

The liquid water recovered may be recycled to the cell for renewed evaporation. It is only a fraction of the water vaporized and will not suffice to sustain cell cooling. Additional water needs to be condensed by a heat exchanger prior or after the air contacts the hydride capsule to recover enough water for a self-sustaining operation.

The invention well attains the stated objects and advantages and others. Illustrated details are exemplary only and are not to be taken as limitations on the invention except as those details may be included in the appended claims.

We claim:

1. An ion exchange membrane cell comprising:
   a first electrode and a second electrode both in contact with an ion exchange electrolyte member positioned therebetween,
   a first reactant distribution member in flow communication with said first electrode for supplying a first reactant thereto,
   a second reactant distribution member in flow communication with said second electrode for supplying a second reactant thereto,
   said first and second distribution members being electrically-conductive and contained between gas impermeable electrically-conductive members, and
   a fluid-permeable electrically-conductive member between said impermeable members and positioned outward of said electrodes and spaced therefrom for storage and transport of liquid.

2. An ion exchange fuel cell comprising:
   a fuel electrode and a reactant electrode,
   an ion exchange electrolyte member between and in contact with said fuel electrode and said reactant electrode,
   a fuel distribution member in flow communication with said fuel electrode for supplying fuel thereto,
   a reactant distribution member in flow communication with said reactant electrode for supplying a reactant thereto,
   said fuel distribution member and said reactant distribution member being electrically-conductive and contained between gas impermeable electrically-conductive members, and
   a fluid-permeable electrically-conductive member between said impermeable members and positioned outward of said electrodes and spaced therefrom for storage and transport of liquid.

3. An ion exchange fuel cell comprising:
   a planar fuel electrode and a planar oxygen electrode,
   a planar ion exchange electrolyte member sandwiched between and in contact with said fuel electrode and said oxygen electrode,
   a permeable planar electrically-conductive fuel distribution member in contact with and over a surface of said fuel electrode for supplying hydrogen gas fuel thereto,
   a permeable planar electrically-conductive oxygen distribution member in contact with and over a surface of said oxygen electrode for supplying an oxygen containing gas thereto,
   said fuel distribution member and said oxygen distribution member contained between a pair of gas impermeable electrically-conductive separator plates,
   a fluid-permeable electrically-conductive planar member between said separator plates and positioned outward of said electrodes and spaced therefrom for storage and transport of water.

4. The fuel cell according to claim 3 wherein fluid-permeable member is in contact with said oxygen distribution plate.

5. The fuel cell according to claim 3 wherein said fluid-permeable member comprises a fiber pad having a metal screen embedded therein.

6. The fuel cell according to claim 5 wherein said fiber is a mineral fiber.

7. The fuel cell according to claim 5 wherein said fiber is an organic fiber.

8. The fuel cell according to claim 3 wherein said fluid-permeable member is made of carbon and is rendered hydrophylic by impregnation with a material such as colloidal silica therein.

9. The fuel cell according to claim 3 wherein said fluid-permeable member is made of metal felt and rendered hydrophylic by impregnation with a material such as colloidal silica.

10. The fuel cell according to claim 3 wherein said distribution members are metal screens.

11. The fuel cell according to claim 3 wherein said distribution members are metallized plastic screens, or porous plastics.

12. The fuel cell according to claim 3 wherein said distribution members are perforated and corrugated metal sheets.

13. The fuel cell according to claim 3 wherein said distribution members are made of metal felt.

14. The fuel cell according to claim 3 wherein said distribution members are made of carbon foam.

15. The fuel cell according to claim 14 wherein said carbon foam is reticulated vitreous carbon.

16. The fuel cell according to claim 3 wherein said distribution members are porous graphite.

17. The fuel cell according to claim 3 wherein said distribution members are porous or grooved ceramics rendered conductive by coating with metal films or wrapping with metal screens.

18. The fuel cell according to claim 3 wherein the thickness of each said distribution member is in a range from 0.2 mm to 5 mm.

19. The fuel cell according to claim 3 wherein said distribution members are rendered hydrophobic by impregnation of tetrafluorethylene.

20. The fuel cell according to claim 3 wherein each of said gas separator plates is made of metal e.g. tantalum, niobium, stainless steel, copper, etc.

21. The fuel cell according to claim 3 wherein each of said gas separator plates has a thickness in a range from 0.05 mm to 2 mm and is provided with metallic coatings to improve corrosion resistance and/or reduce contact resistance.

22. The fuel cell according to claim 21 wherein said metallic coatings are gold.

23. The fuel cell according to claim 21 wherein said metallic coatings are nickel.

24. The fuel cell according to claim 20 wherein the gas separator element may be an electrically conductive gas impermeable non-metallic material such as Grafoil.

25. A fuel cell comprising:
a catalytic fuel electrode to which a fuel is fed;
a catalytic oxygen electrode to which an oxygen containing gas is fed;
an ion exchange membrane as an electrolyte member between and in contact with said fuel electrode and said oxygen electrode;
an electrically-conductive reactant distribution member in contact with said fuel electrode providing means for supplying fuel to said fuel electrode;
an electrically-conductive reactant distribution member in contact with said oxygen electrode providing means for supplying oxygen containing gas to said oxygen electrode;
a water-permeable electrically-conductive member in contact with at least one of said reactant distribution members and isolated from said electrodes and providing means for storing and transporting liquid water to and from said fuel cell; and
gas impervious conductive outer face members for separating reactant gases.

26. An ion exchange membrane fuel cell system according to claim 3 with heat removing means for removing heat from said fuel cell.

27. The system according to claim 26 wherein said heat removing means comprises water evaporation means within the system, a major portion of the water being supplied from a water source external to the system.

28. The system according to claim 27 in which the flow rate of the reactant gas stream exceeds two times stoichiometric.

29. The system according to claim 27 which further includes a condensing surface spaced from said fuel cell and upon which the reactant gas stream bearing saturated water vapor impinges upon exiting said fuel cell giving up heat and condensing moisture for subsequent recirculation to said fuel cells.

30. The system according to claim 26 wherein said heat-removing means includes cooling elements between at least some of adjacent pairs of said fuel cells for passage of cooling air through said cooling elements.

31. The system according to claim 26 wherein said system is bipolar an heat-removing means includes cooling elements between at least some of adjacent pairs of said fuel cells for passage of cooling liquid through said cooling elements.

32. A fuel cell system comprising a fuel cell according to claim 3, a hydride container and a reversible metal hydride bed within said container for generating gaseous hydrogen which is the fuel for said fuel cell.

33. The fuel cell system of claim 32, said system further comprising means for passing hot liquid produced in said fuel cell to said hydride container and utilizing the heat of the hot liquid to liberate gaseous hydrogen in said hydride bed to fuel said fuel cell.

34. The fuel cell system of claim 32, said system further comprising means for passing cooling air or moist reactant air from the fuel cell to said hydride container and utilizing the heat content of the air to liberate gaseous hydrogen in said hydride bed to fill said fuel cell.

35. A fuel cell system comprising a fuel cell, a hydride container, a metal hydride bed within said container for generating gaseous hydrogen which is the fuel for said fuel cell, and means for passing fuel cell waste heat to the hydride bed by direct thermal conduction using the separator plates to conduct the heat to the cell edge for transfer to the hydride bed.

36. An ion exchange membrane fuel cell system and water recovery system for use in zero gravity conditions, said water recovery system consisting of fluid permeable distribution plates, wicking pad, fluid absorbent blotter and inflated bladder.

37. An ion exchange membrane fuel cell system and water storage and recovery system, said water storage and recovery system consisting of enlarged fluid permeable distribution plates manifolded and connected to an evacuation line.

* * * * *

UNITED STATES PATENT AND TRADEMARK OFFICE
CERTIFICATE OF CORRECTION

PATENT NO. : 4,826,741

DATED : May 2, 1989

INVENTOR(S) : Otto J. Adlhart et al.

It is certified that error appears in the above-identified patent and that said Letters Patent is hereby corrected as shown below:

On the title page, Item [19], "Aldhart et al." should read -Adlhart et al. -.

Item [75], Otto J. Aldhart" should read

-- Otto J. Adlhart --.

Signed and Sealed this

Sixteenth Day of January, 1990

*Attest:*

JEFFREY M. SAMUELS

*Attesting Officer*  *Acting Commissioner of Patents and Trademarks*